(12) United States Patent
Wheeler et al.

(10) Patent No.: US 10,562,449 B2
(45) Date of Patent: Feb. 18, 2020

(54) ACCELEROMETER-BASED EXTERNAL SOUND MONITORING DURING LOW SPEED MANEUVERS

(71) Applicant: Ford Global Technologies, LLC, Dearborn, MI (US)

(72) Inventors: Joshua Wheeler, Trenton, MI (US); Scott Andrew Amman, Milford, MI (US); John Edward Huber, Novi, MI (US); Leah Busch, Berkley, MI (US); Ranjani Rangarajan, Farmington Hills, MI (US); Erick Michael Lavoie, Dearborn, MI (US); Marla Johnston, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 15/714,854

(22) Filed: Sep. 25, 2017

(65) Prior Publication Data
US 2019/0092229 A1 Mar. 28, 2019

(51) Int. Cl.
*B60Q 5/00* (2006.01)
*B60J 9/00* (2006.01)

(52) U.S. Cl.
CPC .............. *B60Q 5/005* (2013.01); *B60J 9/00* (2013.01)

(58) Field of Classification Search
None
See application file for complete search history.

(56) References Cited

U.S. PATENT DOCUMENTS

| | | |
|---|---|---|
| 4,655,673 A * | 4/1987 | Hawkes ................ B25J 13/003 414/730 |
| 5,748,075 A | 5/1998 | Dirmeyer et al. |
| 6,057,660 A | 5/2000 | Meier et al. |
| 6,278,377 B1 | 8/2001 | Deline |
| 6,732,566 B2 | 5/2004 | Roelleke et al. |
| 6,889,189 B2 | 5/2005 | Boman |

(Continued)

FOREIGN PATENT DOCUMENTS

| | | |
|---|---|---|
| CN | 201731408 U | 2/2011 |
| CN | 104405272 B | 1/2016 |

(Continued)

OTHER PUBLICATIONS

Search Report dated Apr. 3, 2018 for Great Britain Patent Application No. GB 1716042.5 (3 Pages).

(Continued)

*Primary Examiner* — Jean Paul Cass
(74) *Attorney, Agent, or Firm* — Frank Lollo; Eversheds Sutherland (US) LLP

(57) ABSTRACT

Method and apparatus are disclosed for accelerometer-based external sound monitoring during low speed maneuvers. An example vehicle includes accelerometers affixed to windows of the vehicle, speakers located inside the vehicle, and an infotainment head unit. Each of the speakers is uniquely associated with one of the accelerometers. The infotainment head unit, when a speed of the vehicle satisfies a threshold, selects a zone corresponding to a direction of travel of the vehicle. Additionally, the infotainment head unit plays signals captured by the accelerometers associated with the selected zone on the corresponding speakers.

15 Claims, 3 Drawing Sheets

(56) References Cited

U.S. PATENT DOCUMENTS

| | | | |
|---|---|---|---|
| 7,016,836 B1 | 3/2006 | Yoda | |
| 7,149,318 B2 | 12/2006 | Bank et al. | |
| 7,164,117 B2* | 1/2007 | Breed | B60R 21/01516 250/208.1 |
| 7,475,587 B2 | 1/2009 | Kithil | |
| 7,516,645 B2 | 4/2009 | Kithil | |
| 7,663,502 B2* | 2/2010 | Breed | B60C 11/24 340/12.25 |
| 7,697,698 B2 | 4/2010 | Brown | |
| 7,772,839 B2* | 8/2010 | Watson | B60R 21/0136 324/228 |
| 7,853,026 B2 | 12/2010 | DeLine et al. | |
| 8,068,942 B2* | 11/2011 | Breed | B60C 11/24 701/1 |
| 8,077,022 B2 | 12/2011 | Baruco et al. | |
| 8,165,875 B2 | 4/2012 | Hetherington et al. | |
| 8,285,545 B2 | 11/2012 | Lee et al. | |
| 8,447,044 B2 | 5/2013 | Nongpiur et al. | |
| 8,515,095 B2 | 8/2013 | Bard | |
| 8,538,749 B2* | 9/2013 | Visser | G10L 21/02 704/200 |
| 8,682,005 B2 | 3/2014 | Watson et al. | |
| 8,724,832 B2 | 5/2014 | Stephanou et al. | |
| 8,849,656 B2 | 9/2014 | Schmidt et al. | |
| 8,996,383 B2 | 3/2015 | Rodemer | |
| 9,014,392 B2 | 4/2015 | Sato et al. | |
| 9,020,690 B2 | 4/2015 | McKown et al. | |
| 9,117,318 B2 | 8/2015 | Ricci | |
| 9,124,219 B2 | 9/2015 | Thormundsson | |
| 9,154,893 B1 | 10/2015 | Breed | |
| 9,218,698 B2 | 12/2015 | Ricci | |
| 9,263,040 B2 | 2/2016 | Tzirkel-Hancock et al. | |
| 9,317,983 B2 | 4/2016 | Ricci | |
| 9,330,684 B1 | 5/2016 | Kirsch | |
| 9,418,674 B2 | 8/2016 | Tzirkel-Hancock et al. | |
| 9,469,247 B2 | 10/2016 | Juneja et al. | |
| 9,539,984 B2 | 1/2017 | Dias | |
| 9,665,873 B2* | 5/2017 | Ackland | A63B 24/0075 |
| 9,697,355 B1* | 7/2017 | Park | G06F 21/552 |
| 9,870,697 B2 | 1/2018 | Frew | |
| 10,262,648 B2* | 4/2019 | Lu | G10K 11/16 |
| 2003/0209893 A1* | 11/2003 | Breed | B60J 10/00 280/735 |
| 2004/0246607 A1 | 12/2004 | Watson | |
| 2004/0260547 A1 | 12/2004 | Cohen | |
| 2005/0071159 A1 | 3/2005 | Boman et al. | |
| 2005/0074131 A1 | 4/2005 | McCall et al. | |
| 2005/0109075 A1 | 5/2005 | Kithil | |
| 2006/0184361 A1 | 8/2006 | Lieb | |
| 2007/0005206 A1 | 1/2007 | Zhang | |
| 2007/0086624 A1* | 4/2007 | Breed | G06K 9/00362 382/104 |
| 2007/0104026 A1 | 5/2007 | Rubin | |
| 2007/0277622 A1 | 12/2007 | Kithil | |
| 2008/0040005 A1 | 2/2008 | Breed | |
| 2008/0129475 A1* | 6/2008 | Breed | G07C 5/008 340/438 |
| 2008/0175405 A1 | 7/2008 | Couvillon | |
| 2008/0226098 A1 | 9/2008 | Haulick | |
| 2008/0273711 A1 | 11/2008 | Broussard et al. | |
| 2009/0115635 A1 | 5/2009 | Berger | |
| 2009/0116661 A1 | 5/2009 | Hetherington | |
| 2009/0125311 A1 | 5/2009 | Haulick et al. | |
| 2009/0164147 A1 | 6/2009 | Kithil | |
| 2009/0216526 A1 | 8/2009 | Schmidt | |
| 2010/0239101 A1* | 9/2010 | Okamura | H04R 1/005 381/71.1 |
| 2012/0140946 A1 | 6/2012 | Yen | |
| 2012/0191447 A1 | 7/2012 | Joshi | |
| 2012/0299718 A1 | 11/2012 | Yoshino | |
| 2013/0053990 A1* | 2/2013 | Ackland | G06Q 30/02 700/91 |
| 2013/0188794 A1 | 7/2013 | Kawamata | |
| 2013/0211828 A1 | 8/2013 | Gratke | |
| 2013/0308784 A1 | 11/2013 | Dickens et al. | |
| 2014/0294189 A1* | 10/2014 | Pan | G10K 11/17883 381/71.4 |
| 2014/0306826 A1 | 10/2014 | Ricci | |
| 2015/0117155 A1 | 4/2015 | Jang et al. | |
| 2015/0139428 A1 | 5/2015 | Reining | |
| 2015/0156587 A1 | 6/2015 | Herbig et al. | |
| 2015/0239320 A1 | 8/2015 | Eisenhour et al. | |
| 2015/0365743 A1 | 12/2015 | Konigsberg et al. | |
| 2016/0019890 A1 | 1/2016 | Amman | |
| 2016/0019904 A1 | 1/2016 | Charette | |
| 2016/0119890 A1 | 1/2016 | Amman et al. | |
| 2016/0188285 A1* | 6/2016 | Luk | G06F 3/165 700/94 |
| 2016/0217689 A1 | 7/2016 | Young et al. | |
| 2016/0267908 A1 | 9/2016 | Borjeson | |
| 2016/0299011 A1 | 10/2016 | Ihle | |
| 2016/0320840 A1* | 11/2016 | Hwang | G06F 3/015 |
| 2016/0355125 A1 | 12/2016 | Herbert | |
| 2017/0018127 A1 | 1/2017 | Yang et al. | |
| 2017/0088072 A1 | 3/2017 | Curtis | |
| 2017/0118556 A1 | 4/2017 | Macours | |
| 2017/0171679 A1* | 6/2017 | Isberg | G06F 3/162 |
| 2017/0345270 A1* | 11/2017 | Singh | G08B 21/02 |
| 2018/0113673 A1* | 4/2018 | Sheynblat | G10L 17/00 |
| 2018/0249250 A1* | 8/2018 | Pate | H04R 5/04 |
| 2018/0336000 A1* | 11/2018 | Vaughn | G06F 3/165 |
| 2019/0019488 A1* | 1/2019 | Lu | G10K 11/16 |

FOREIGN PATENT DOCUMENTS

| | | |
|---|---|---|
| CN | 103770736 B | 12/2016 |
| CN | 106341755 A1 | 1/2017 |
| DE | 10164509 A1 | 7/2003 |
| DE | 10254684 A1 | 6/2004 |
| DE | 102009046132 A1 | 5/2011 |
| DE | 102011003730 A1 | 7/2011 |
| EP | 1078818 A2 | 2/2001 |
| FR | 2825882 A1 | 12/2002 |
| JP | 3802897 B2 | 5/2006 |
| JP | 2010000963 A | 1/2010 |
| KR | 0150554 B1 | 6/1998 |
| KR | 101018783 B1 | 3/2011 |
| WO | WO 98/047109 A1 | 10/1998 |
| WO | WO 2013/90007 A1 | 6/2013 |

OTHER PUBLICATIONS

Benson, K. Blair et al. Standard handbook of Audio and Radio Engineering. McGraw-Hill, 2002, p. 1-10.

Piezo Acoustics: Turning, Windows into Invisible Speakers and Helping James Bond Keep Secrets, 4 pages.

Karen M., Stickable Sound Pads Turn Any Surface Into a Speaker, Jul. 30, 2008,4 pages.

Ruotsalainen et al., Wireless system for the continuous observation of whole-body vibration in heavy machinery, 2013, IEEE, p. 26-32 (Year: 2013).

Bruel et al., Measuring Vibration, 1982, Internet, p. 1-40 (Year: 1982).

Hafizi et al., Modal properties investigation of car body-in-white with attached windscreen and rear screen, 2019, Internet, p. (Year: 2019).

Christian Bolzmacher et al., *Transforming Car Glass Into Microphones Using Piezoelectric Transducers*, Microsystem Technologies, Jul. 2016, vol. 22, Issue 7, 3 pages.

* cited by examiner

ACCELEROMETER-BASED EXTERNAL SOUND MONITORING DURING LOW SPEED MANEUVERS

TECHNICAL FIELD

The present disclosure generally relates to vehicle sound systems and, more specifically, accelerometer-based external sound monitoring during low speed maneuvers.

BACKGROUND

Increasingly, with customer comfort in mind, vehicles are being manufactured with improved sealing and noise cancellation systems to isolate exterior noises from the interior of the cabin. This helps keep the driving experience comfortable and noise free. However, in some instances, blocking the exterior noise can be disadvantageous. For example, when a vehicle is pulling forward or reversing out of a parking spot, the driver needs to be aware of obstacles outside the vehicle that is hidden from view. In such an example, because the cabin is isolated from noise, the driver must rely on vision or range detection sensors to detect those obstacles. However, audible signs of persons or animals may be more quickly perceived by the driver facilitating the driver reacting quicker.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for accelerometer-based external sound monitoring during low speed maneuvers. An example vehicle includes accelerometers affixed to windows of the vehicle, speakers located inside the vehicle, and an infotainment head unit. Each of the speakers is uniquely associated with one of the accelerometers. The infotainment head unit, when a speed of the vehicle satisfies a threshold, selects a zone corresponding to a direction of travel of the vehicle. Additionally, the infotainment head unit plays signals captured by the accelerometers associated with the selected zone on the corresponding speakers.

An example method includes, when a speed of a vehicle satisfies a threshold, selecting a zone corresponding to a direction of travel of the vehicle. The method also includes dimming sound from other audio sources inside the vehicle. Additionally, the method includes driving signals captured by accelerometers associated with the selected zone onto corresponding speaker channels electrically coupled to speakers inside the vehicle.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
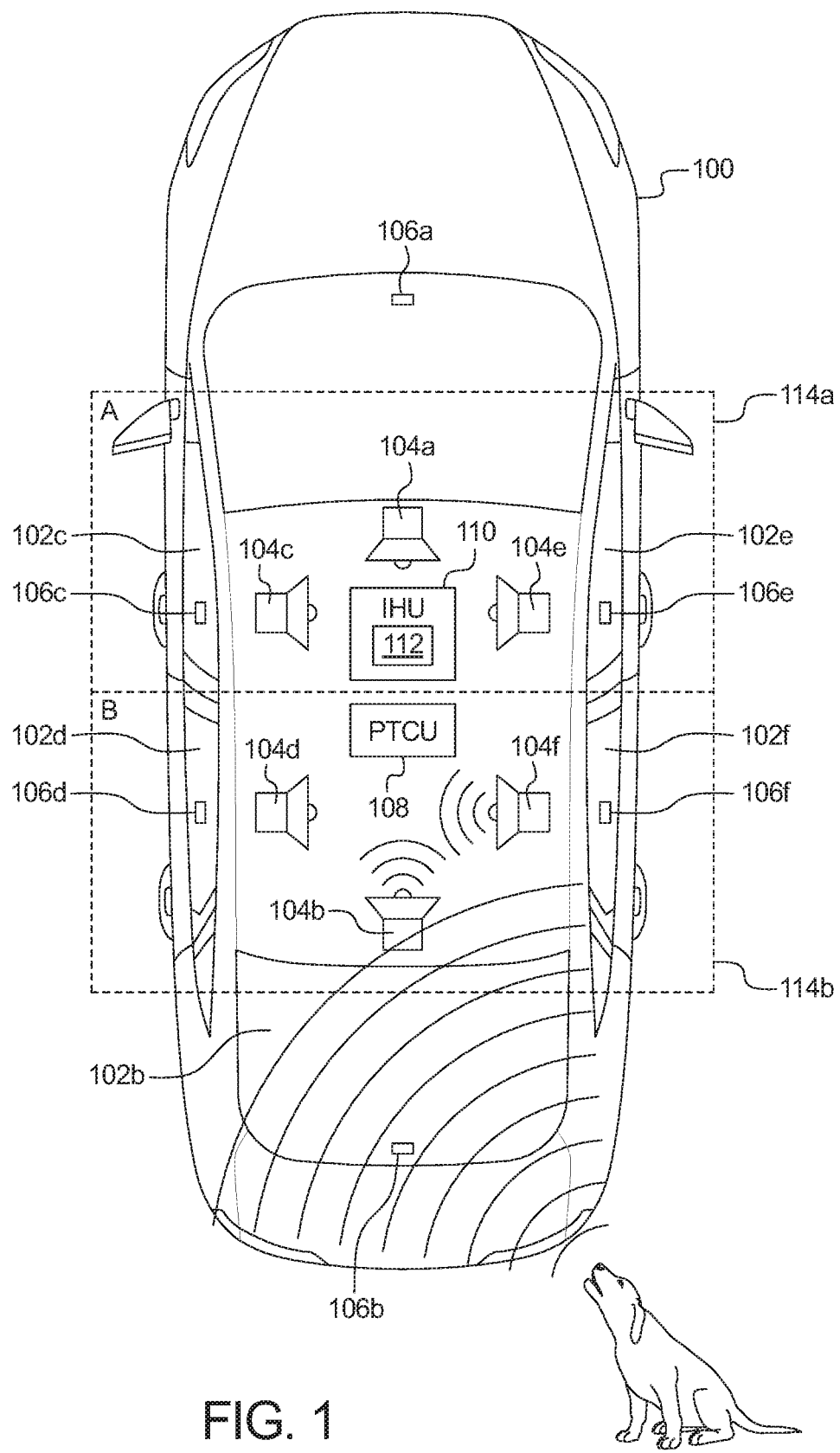
FIG. 1 illustrates a vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Generally, passenger comfort is increased by isolating exterior noise from the interior of the cabin. In some instances, isolating the exterior noise from the interior of the cabin is not desirable. For example, when a vehicle is moving slowly (e.g., when parking, when unparking, when maneuvering in a residential neighborhood, etc.), a driver may desire to be aurally aware of environment around the vehicle to detect obstacles (e.g., children on bicycles, pets, etc.). Additionally, the driver may desire to hear messages from people outside the vehicle. For example, a person standing outside the vehicle may give directions to park or inform the driver of an object left on the roof of the vehicle. Microphones on the outside of the vehicle could broadcast the exterior sound inside the vehicle, so the occupant would be aware of their surroundings when the doors and windows are closed. However, traditional electric condenser microphones (ECMs) are not constructed for external use. Their delicate microphone diaphragms can be rendered unusable by dirt, snow, rain, or mud.

As disclosed below, accelerometers are placed on the edge of vehicle glass surfaces. Sound causes oscillation as it travels through a medium, such as the glass surfaces of the vehicle. This oscillation is measured as a vibration with the accelerometer when the pressure wave impinges on a window of the vehicle. The resulting electrical output from the accelerometer is processed to reproduce the sound to be played into the cabin. Accelerometers are installed on the windows (e.g., the windshield, the back glass, the left front door glass, the left backseat door glass, the right front door glass, the right backseat door glass, the moon roof, etc.) of the vehicle. The sounds captured by the accelerometers are played only on adjacent speakers inside the vehicle. For example, the signal from left front door glass accelerometer may be played only on a speaker embedded in the left front door, the signal from left backseat door glass accelerometer may be played only on a speaker embedded in the left backseat door, the signal from right front door glass accelerometer may be played only on a speaker embedded in the right front door, the signal from right backseat door glass accelerometer may be played only on a speaker embedded in the right backseat door, the signal from the windshield accelerometer may be played on a speaker embedded in the dashboard, the signal from the rear glass accelerometer may be played on a speaker embedded in the rear package tray or the rear door, and/or the signal from the moon roof accelerometer may be played on a speaker embedded in the ceiling.

The sound system only plays the sounds through the speakers when the vehicle is traveling below a threshold speed (e.g., 5 miles per hour (mph), 10 mph, etc.). Additionally, the speakers are divided into zones that correspond to the direction of travel to the vehicle. For example, a forward zone may be defined to include the front speakers and a rear zone may be defined to include the rear speakers. When the vehicle is traveling under a threshold speed in one direction, the sound system only plays sounds from the speakers in the corresponding zone. For example, when the vehicle is moving forward under 10 mph, the sound system may only play sounds from the speakers in the front zone. In such a manner, the sound system of vehicle provides a directional sound experience that facilitates detecting audible activity outside the vehicle in the direction of travel while providing a robust system that is resistant to environmental factors, such as by dirt, snow, rain, or mud.

FIG. 1 illustrates a vehicle 100 operating in accordance with the teachings of this disclosure. In some examples, the vehicle 100 is a police vehicle. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a power train with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes windows 102a-102f, speakers 104a-104f, accelerometers 106a-106f, a power train control unit (PTCU) 108, and a infotainment head unit (IHU) 110.

The windows include a windshield 102a, a back glass 102b, a left front door glass 102c, a left backseat door glass 102d, a right front door glass 102e, a right backseat door glass 102f, and/or a moon roof (not shown). Some of the windows 102a-102f are made of laminated glass (sometimes referred to as "safety glass") (e.g., the windshield 102a, etc.) and some of the windows 102a-102f are made of non-laminated tempered glass (e.g., the left front door glass 102c, the left backseat door glass 102d, the right front door glass 102e, the right backseat door glass 102f, etc.). The glass of the windows 102a-102f vibrates when struck by sound waves.

Each one of the speakers 104a-104f is positioned to correspond with one of the windows 102a-102f. In some examples, a speaker 104a corresponding to the windshield 102a is embedded in the dashboard, a speaker 104b corresponding to the back glass 102b is embedded into a rear package tray or a rear door (e.g., a liftgate, etc.), a speaker 104c corresponding to the left front door glass 102c is embedded in the side panel of the left front door, a speaker 104d corresponding to the side panel of the left backseat door glass 102d is embedded in the left backseat door, a speaker 104e corresponding to the right front door glass 102e is embedded into the side panel of the right front door, a speaker 104f corresponding to the right backseat door glass 102f is embedded into the side panel of the right backseat door, and/or a speaker (not shown) corresponding to the moon roof is embedded into the ceiling panel proximate the moon roof. Alternatively, in some examples, the speakers 104a-104f are ribbon speakers that are embedded into the ceiling liner around the parameter of the ceiling of the cabin of the vehicle 100 proximate the corresponding window 102a-102f. In some examples, the speakers 104a-104f are integrated into the audio sound system (e.g., the radio, the digital media player, etc.) and/or noise cancellation system of the vehicle 100. Alternatively, the speakers 104a-104f are separate from the speakers associated with the audio sound system and/or noise cancellation system of the vehicle 100.

The accelerometers 106a-106f may be any type of accelerometer that (a) measures the vibrations perpendicular to the plane of glass of the corresponding window 102a-102f and (b) measures a wide frequency range (e.g., the frequency range of audible sound, etc.), including uniaxial or triaxial accelerometers, micromachined or piezoelectric accelerometers, etc. Each one of the accelerometers 106a-106f is rigidly mounted on a corresponding one of the windows 102a-102f on the interior of the cabin of the vehicle 100. In some example, the accelerometers 106a-106f are mounted on the windows 102a-102f in a manner as to not obstruct the view of the driver. For example, the accelerometer 106a on the windshield 102a may be attached to the glass of the windshield 102a proximate to where the rear-view mirror is mounted. As another example, the accelerometer 106b on the back glass 102b may be attached to the glass of the back glass 102b proximate to the rear defroster connector on the glass or where the rear brake light is mounted. The accelerometers are wired or wirelessly communicatively coupled to the infotainment head unit 110 to send signals of the vibrations of the windows 102a-102f to the infotainment head unit 110.

The power train control module 108 includes hardware and firmware to control the ignition, fuel injection, emission systems, transmission and/or the brake system of the vehicle 100. The power train control module 108 monitors sensors (such as fuel injection sensors, wheel speed sensors, exhaust sensors, etc.) and uses control algorithms to control, for example, fuel mixture, ignition timing, variable cam timing, emissions control, a fuel pump, an engine cooling fan and/or a charging system. In the illustrated example, the power train control module 108 sends messages via a vehicle data bus (e.g., via the vehicle data bus 202 of FIG. 2) regarding the speed of the vehicle 100.

The infotainment head unit 110 provides an interface between the vehicle 100 and a user. The infotainment head unit 110 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In some examples, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display. The infotainment head unit 110 includes a physical button or a soft button (e.g., via the infotainment system) to enable and disable the accelerometer-based external sound monitoring system. In the illustrated example, the infotainment head unit includes a sound monitor 112.

The sound monitor 112 divides the speakers 104a-104f into zones 114a and 114b. In the illustrated example a front zone 114a includes the speaker 104a corresponding to the windshield 102a, the speaker 104c corresponding to the left front door glass 102c, and the speaker 104e corresponding to the right front door glass 102e. A rear zone 114b includes the speaker 104b corresponding to the back glass 102b, speaker 104d corresponding to the side panel of the left backseat door glass 102d, and speaker 104f corresponding to the right backseat door glass 102f. Based on the direction of travel of the vehicle 100 (e.g., forward or reverse), the sound monitor selects one of the zones 114a and 114b. In the illustrated example, when the vehicle 100 is traveling forward (e.g., the transmission is in a drive gear), the sound monitor 112 selects the front zone 114a. When the vehicle is traveling in reverse (e.g., the transmission is in the reverse gear), the sound monitor 112 selects the rear zone 114b. The sound monitor 112 enables the accelerometers 106a-106f corresponding to the selected zone 114a and 114b when the speed of the vehicle 100 satisfies (e.g., is less than or equal to) a threshold speed. In some examples, the threshold speed is 10 mph.

When the accelerometer-based external sound monitoring system is enabled, the sound monitor 112 receives the signals from the accelerometers 106a-106f, and processes the signals. The sound monitor 112 plays sounds based on the signals on the corresponding speakers 104a-104f. In some examples, when the external sound monitoring system is enabled, the sound monitor 112 disables, mutes, or lowers the volume of other sources of audio (e.g., the radio, the digital media player, etc.). When the sound monitor 112 receives a signal from one of the accelerometers 106a-106f, the sound manager processes the signal. In some examples, the sound monitor 112 processes the signal with a high pass filter to filter out frequencies associated with low-frequency boom or rumble (e.g., such as those caused by wind, etc.). In some examples, the sound monitor 112 performs other sound signal processing, such as amplification and/or equalization.

The sound monitor 112 is coupled to separate channels, each associated with one of the speakers 104a-104f. When a signal from one of the accelerometers 106a-106f is received, the sound monitor 112 drives the channel corresponding to the one of the speakers 104a-104f that is associated with the particular one of the accelerometers 106a-106f from which the signal was received. For example, when the signal is received from the accelerometer 106a attached to the windshield 102a, the sound monitor 112 drives the channel associated with the speaker 104a embedded in the dashboard. When multiple signals from multiple accelerometers 106a-106f are received, the sound monitor 112 drives multiple channels with the corresponding signal. For example, when a first signal is received from the accelerometer 106a attached to the windshield 102a and a second signal received from the accelerometer 106b attached to the back glass 102b at the same time, the sound monitor 112 drives the channel associated with the speaker 104a embedded in the dashboard with the first signal and the speaker 104b embedded in the rear package tray or the rear door with the second signal. In such a manner, the sound monitor 112 provides a surround sound experience based on the actual direction that the noise is originating from so the occupant(s) of the vehicle 100 can determine the location of the noise. The sound monitor enables the different channels based on the 114a and 114b that is activated such that channels associated with accelerometers 106a-106f in different zones 114a and 114b are not enabled at the same time.

For example, if a dog is barking while sitting near the external rear right corner of the vehicle 100 while the vehicle 100 is traveling at 5 mph in reverse, the accelerometer 106b attached the back glass 102b and the accelerometer 106f attached to the right backseat door glass 102f may generate signals. In such an example, the sound monitor 112 may enabled the channels associated the accelerometers in the rear zone 114b and drive the signals from the accelerometers 106b and 106f onto the channels of the corresponding speakers 104b and 104f. In such a manners, even if one of the accelerometers 106a, 106d, and 106e associated with the forward zone 114a generate signals in response to the dog barking, the sound monitor 112 will not driver the signals on those corresponding channels.

Figure 2:
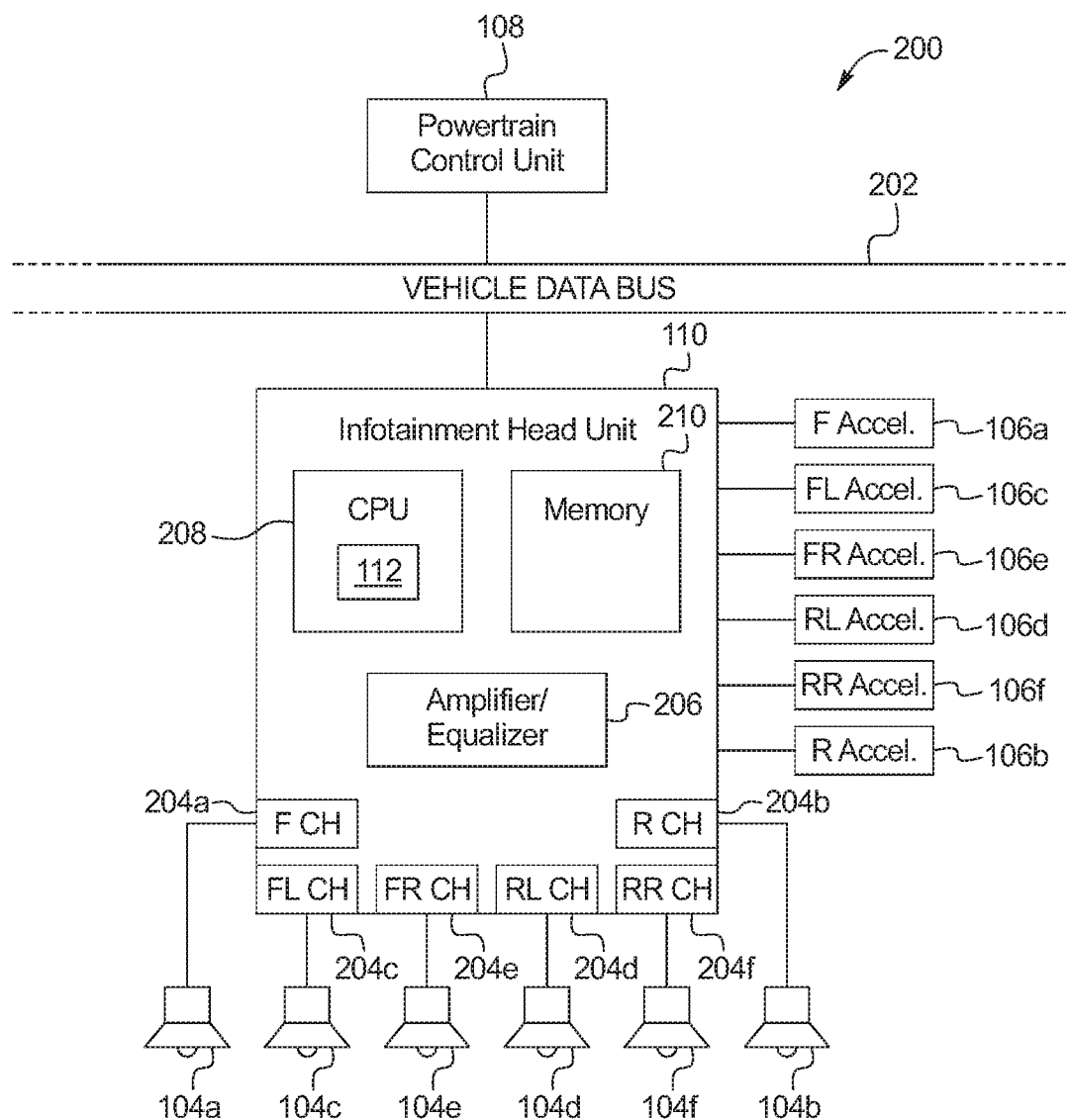
FIG. 2 is a block diagram of electronic components of the vehicle of FIG. 1.

FIG. 2 is a block diagram of electronic components 200 of the vehicle 100 of FIG. 1. In the illustrated example, the electronic components 200 include the speakers 104a-104f, the accelerometers 106a-106f, the power train control module 108, the infotainment head unit 110, and a vehicle data bus 202.

The infotainment head unit 110 includes channels 204a-204f, an amplifier/equalizer 206, a processor 208, and memory 210. The channels 204a-204f are electrically coupled to the speaker 104a-104f. The channels 204a-204f are communicatively coupled to the amplifier/equalizer 206. When a signal is received from one of the accelerometers 106a-106f, the sound monitor 112, via the amplifier/equalizer 206, drivers the signal on the corresponding of the channels 204a-204f. The amplifier/equalizer 206 receives the signals from the accelerometers 106a-106f and process the signals to be suitable for reproduction (e.g., amplify the signal, etc.) on the speakers 104a-114f based on, for example, audio preferences and settings entered into the infotainment head unit 110 by an occupant.

In the illustrated example, the infotainment head unit 110 is structured to include sound monitor 112. The processor or controller 208 may be any suitable processing device or set of processing devices such as, but not limited to: a microprocessor, a microcontroller-based platform, a digital signal processor, a suitable integrated circuit, one or more field programmable gate arrays (FPGAs), and/or one or more application-specific integrated circuits (ASICs). The memory 210 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 210 includes multiple kinds of memory, particularly volatile memory and non-volatile memory.

The memory 210 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 210, the computer readable medium, and/or within the processor 208 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the power train control module 108 and the infotainment head unit 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
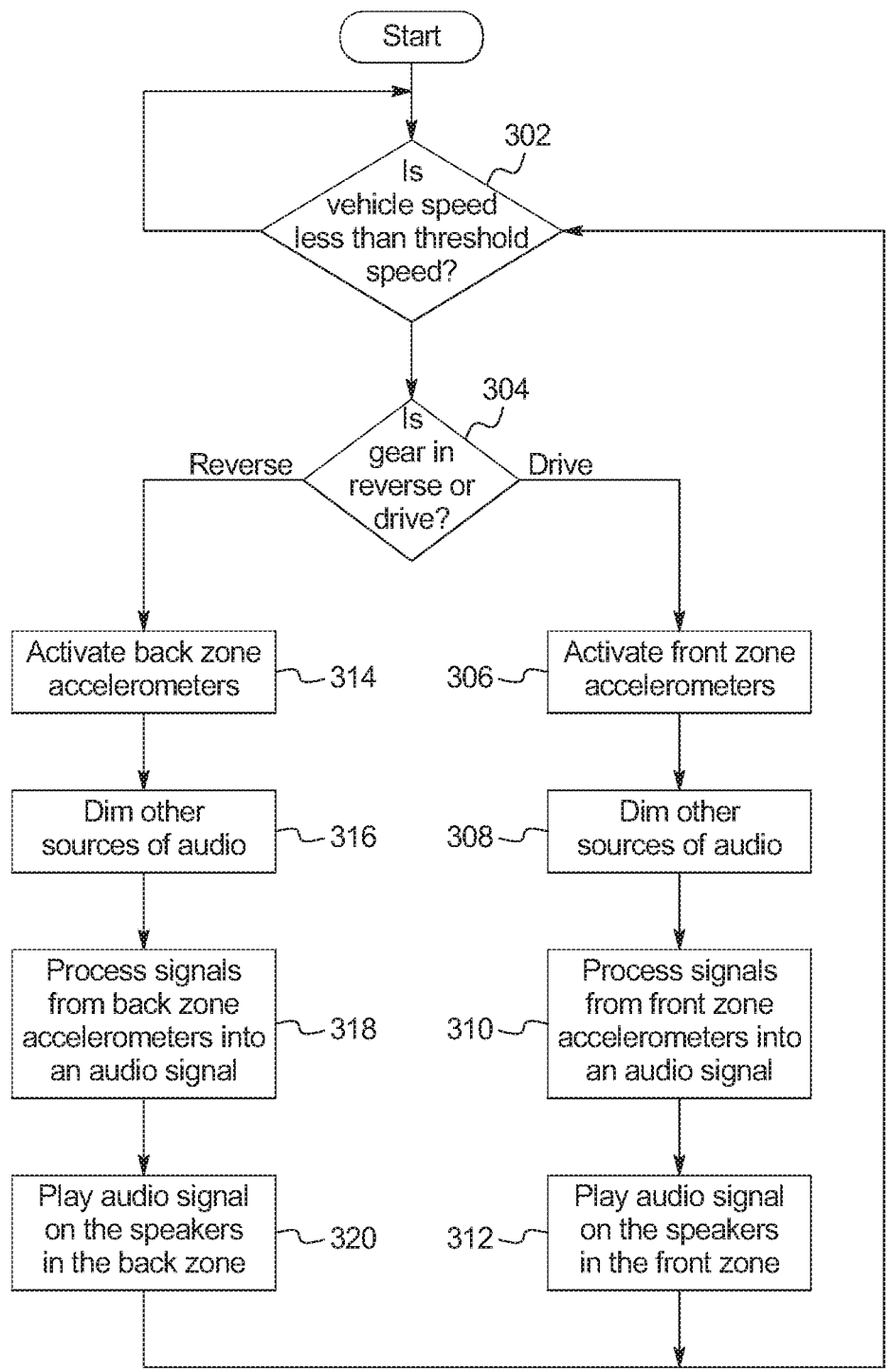
FIG. 3 is a flowchart of a method to provide external noise into the cabin of the vehicle of FIG. 1 while the vehicle is performing low speed maneuvers, which may be implemented by the electronic components of FIG. 2.

FIG. 3 is a flowchart of a method to provide external noise into the cabin of the vehicle 100 of FIG. 1 while the vehicle 100 is performing low speed maneuvers, which may be implemented by the electronic components 200 of FIG. 2. Initially, at block 302, the sound monitor 112 waits until the speed of the vehicle 100 (e.g., as determined by the power train control module 108, etc.) is less that a threshold speed. At block 304, the sound monitor determines e.g., via the power train control module 108, etc.) whether the transmission of the vehicle 100 is in a forward (e.g., drive) gear or the reverse gear. When the transmission of the vehicle 100 is in a forward gear, the method continues at block 306. Otherwise, when the transmission is the reverse gear, the method continues at block 314.

At block 306, the sound monitor 112 activates the accelerometers 106a, 106c, and 106e in the front zone 114a. At block 308, the sound monitor dims or mutes the sound from other sources of audio. At block 310, the sound monitor 112 processes signal(s) from the activated accelerometers 106a, 106c, and 106e into audio signal(s). At block 312, the sound monitor 112 drives the audio signal(s) onto the corresponding one(s) of the speakers 104a, 104c, and 104e.

At block 314, the sound monitor 112 activates the accelerometers 106b, 106d, and 106f in the rear zone 114b. At block 316, the sound monitor dims or mutes the sound from other sources of audio. At block 318, the sound monitor 112 processes signal(s) from the activated accelerometers 106b, 106d, and 106f into audio signal(s). At block 320, the sound monitor 112 drives the audio signal(s) onto the corresponding one(s) of the speakers 104b, 104d, and 104f.

The flowchart of FIG. 3 is representative of machine readable instructions stored in memory (such as the memory 210 of FIG. 2) that comprise one or more programs that, when executed by a processor (such as the processor 208 of FIG. 2), cause the vehicle 100 to implement the example sound monitor 112 and, more generally, the infotainment head unit 110 of FIGS. 1 and 2. Further, although the example program(s) is/are described with reference to the flowchart illustrated in FIG. 3, many other methods of implementing the example sound monitor 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   accelerometers affixed to windows of the vehicle;
   speakers located inside the vehicle, each of the speakers uniquely associated with one of the accelerometers; and
   an infotainment head unit to:
      when a speed of the vehicle satisfies a threshold, select a zone corresponding to a direction of travel of the vehicle; and
      play signals captured by the accelerometers associated with the selected zone on the corresponding speakers.

2. The vehicle of claim 1, including at least six of the accelerometers, each one of the accelerometers affixed to a different one of the windows.

3. The vehicle of claim 1, wherein when the direction of travel is forward, the infotainment head unit is to select a forward zone.

4. The vehicle of claim 3, wherein the forward zone includes at least two of the accelerometers affixed to different one of the windows in a front portion of the vehicle.

5. The vehicle of claim 3, wherein the forward zone includes a first one of the accelerometers affixed to a windshield, a second one of the accelerometers affixed to a driver's side front window, and a third one of the accelerometers affixed to a passenger's side front window.

6. The vehicle of claim 1, wherein when the direction of travel is reverse, the infotainment head unit is to select a rear zone.

7. The vehicle of claim 6, wherein the rear zone includes at least two of the accelerometers affixed to different one of the windows in a rear portion of the vehicle.

8. The vehicle of claim 6, wherein the rear zone includes a first one of the accelerometers affixed to a back glass, a second one of the accelerometers affixed to a driver's side rear window, and a third one of the accelerometers affixed to a passenger's side rear window.

9. The vehicle of claim 1, wherein the accelerometers are to measure vibrations perpendicular to a glass surface of the windows.

10. The vehicle of claim 1, wherein the infotainment head unit is to dim other sources of audio when the speed of the vehicle satisfies the threshold.

11. A method comprising:
   when a speed of a vehicle satisfies a threshold, selecting, with a processor, a zone corresponding to a direction of travel of the vehicle;

dimming sound from other audio sources inside the vehicle; and driving signals captured by accelerometers associated with the selected zone onto corresponding speaker channels electrically coupled to speakers inside the vehicle.

12. The method of claim 11, wherein selecting the zone includes:

when the direction of travel is forward, selecting a forward zone; and when the direction of travel is rearward, selecting a rear zone.

13. The method of claim 12, wherein the forward zone includes at least two of the accelerometers affixed to different one of windows in a front portion of the vehicle and the rear zone includes at least two of the accelerometers affixed to different one of the windows in a rear portion of the vehicle.

14. The method of claim 11, including measuring, with the accelerometers, vibrations perpendicular to a glass surface of windows of the vehicle.

15. The method of claim 11, wherein the speakers are ribbon speakers positioned in a headliner of the vehicle.

\* \* \* \* \*